(12) United States Patent
Euteneuer et al.

(10) Patent No.: US 11,002,978 B2
(45) Date of Patent: May 11, 2021

(54) MICROSCOPE HAVING A BEAM SPLITTER ASSEMBLY

(71) Applicants: Leica Microsystems CMS GmbH, Wetzlar (DE); Gabriele Petri, Butzbach Griedel (DE)

(72) Inventors: Peter Euteneuer, Lahnau (DE); Ralf Krueger, Butzbach Griedel (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 559 days.

(21) Appl. No.: 15/329,624

(22) PCT Filed: Jul. 28, 2015

(86) PCT No.: PCT/EP2015/067315
§ 371 (c)(1),
(2) Date: Jan. 27, 2017

(87) PCT Pub. No.: WO2016/016270
PCT Pub. Date: Feb. 4, 2016

(65) Prior Publication Data
US 2017/0212356 A1     Jul. 27, 2017

(30) Foreign Application Priority Data
Jul. 28, 2014 (DE) ..................... 10 2014 110 606.7

(51) Int. Cl.
*G02B 27/14* (2006.01)
*G02B 21/00* (2006.01)
(Continued)

(52) U.S. Cl.
CPC ....... *G02B 27/141* (2013.01); *G02B 21/0004* (2013.01); *G02B 21/0032* (2013.01); *G02B 21/082* (2013.01); *G02B 21/245* (2013.01)

(58) Field of Classification Search
CPC .............. G02B 21/0032; G02B 21/006; G02B 21/0056; G02B 21/0068–0076;
(Continued)

(56) References Cited

U.S. PATENT DOCUMENTS 3,277,782 A   10/1966 Smith
5,521,755 A    5/1996 Stankewitz
(Continued)

FOREIGN PATENT DOCUMENTS

DE       2021654 B    10/1971
DE       4231267 B4    3/1994
(Continued)

*Primary Examiner* — Kimberly N. Kakalec
(74) *Attorney, Agent, or Firm* — Leydig, Voit & Mayer, Ltd.

(57) ABSTRACT

A microscope includes a light source(s) which produce an illumination beam path comprising light in a plurality of wavelength regions. A dichroic beam splitter arrangement having a dichroic mirror surface is arranged between objective optics and a tube lens in a beam path portion to produce a reflected partial beam and a transmitted partial beam. The beam splitter arrangement changes a propagation direction of the reflected partial beam relative to the illumination beam path by a specified deflection angle. The mirror surface is arranged at an angle of 22.5±7.5°. The beam splitter arrangement includes a further mirror(s) arranged in the reflected beam path. The propagation direction of the reflected partial beam is changed by the specified deflection angle using the sum of all reflections on the mirror surface and the further mirror(s).

11 Claims, 7 Drawing Sheets

(51) Int. Cl.
 *G02B 21/24* (2006.01)
 *G02B 21/04* (2006.01)
 *G02B 21/08* (2006.01)

(58) Field of Classification Search
 CPC .............. G02B 21/06; G02B 21/16; G02B 21/241–247; G02B 21/36–361; G02B 27/1006; G02B 27/141; G02B 27/16; G02B 27/40; G01N 21/6458
 USPC ....... 359/350–357, 359, 368, 379, 381, 383, 359/385–390, 485.01, 485.03–485.05, 359/485.07, 487.01–487.06, 489.01, 359/489.08, 489.11–489.13, 489.19, 580, 359/583, 589, 629, 634, 798–800

See application file for complete search history.

(56) References Cited

U.S. PATENT DOCUMENTS

| 7,071,451 | B2 | 7/2006 | Ishikawa et al. |
| 2003/0011772 | A1 | 1/2003 | Abe et al. |
| 2010/0182683 | A1 | 7/2010 | Okugawa et al. |
| 2011/0101203 | A1 | 5/2011 | Cooper et al. |
| 2011/0317260 | A1 | 12/2011 | Krueger |
| 2013/0094016 | A1* | 4/2013 | Knebel ............... G01M 11/02 356/124 |
| 2013/0308198 | A1 | 11/2013 | Erdogan et al. |

FOREIGN PATENT DOCUMENTS

| DE | 102010030430 A1 | 12/2011 |
| JP | H09-184985 A | 7/1997 |
| JP | 2003021788 A | 1/2003 |
| JP | 2003-270538 A | 9/2003 |
| JP | 2008111914 A | 5/2008 |
| JP | 2013509617 A | 3/2013 |
| JP | 2013088809 A | 5/2013 |

* cited by examiner

MICROSCOPE HAVING A BEAM SPLITTER ASSEMBLY

CROSS-REFERENCE TO PRIOR APPLICATIONS

This application is a U.S. National Phase Application under 35 U.S.C. § 371 of International Application No. PCT/EP2015/067315, filed on Jul. 28, 2015, and claims benefit to German Patent Application No. DE 10 2014 110 606.7, filed on Jul. 28, 2014. The International Application was published in German on Feb. 4, 2016, as WO 2016/016270 A1 under PCT Article 21(2).

FIELD

The invention relates to a microscope having a beam splitter assembly.

BACKGROUND

In modern microscopes, e.g. inverted research microscopes, additional light sources for illumination, manipulation and measurement purposes are coupled into the imaging beam path, preferably into the infinite beam path between the objective and the tube lens, for a wide range of experiments. Moreover, microscopes of this kind are generally provided with means for decoupling specific spectral components of the imaging light coming from the sample. Lasers are usually used as light sources, the laser light of which has a longer or a shorter wavelength than the detection light itself. The light is generally coupled in or decoupled in a right-angled arrangement in which the optical axes of the beam paths in which the coupled or decoupled light and the detection light propagate are arranged at an angle of 90° to one another.

An example of a correspondingly designed microscope is described in U.S. Pat. No. 7,071,451 B2. This microscope contains an autofocus module having a laser light source that emits a first light beam, referred to in the following as the reflected partial beam, the wavelength of which is in the infrared region of the wavelength spectrum. This reflected partial beam strikes a mirror that is provided with a dichroic mirror surface. Said surface is designed so as to reflect the first reflected partial beam onto the sample to be studied. When reflected on the dichroic mirror surface, the propagation direction of the reflected partial beam changes by a deflection angle of 90°. The autofocus module acquires a signal on the basis of the reflected partial signal reflected on the sample, on the basis of which signal the imaging optics of the microscope are focused. For this purpose, the reflected partial beam coming from the sample is reflected again at the dichroic mirror surface in order to guide said beam into the autofocus module.

While the dichroic mirror surface used in this known microscope thus reflects infrared light, it allows detection light in the visible region to pass through. A second light beam in the form of the detection light emitted by the sample is thus provided in addition to the reflected partial beam, which second beam is transmitted by the dichroic mirror surface. This second light beam is referred to in the following as the transmitted partial beam. The dichroic mirror surface thus merges the two beam paths in which the reflected partial beam and the transmitted partial beam propagate. Consequently, the two beam paths have a common beam path portion located between the dichroic mirror surface and the sample. In this case, the dichroic mirror surface is arranged such that the surface normal thereof is arranged at an angle of 45° relative to the optical axis of this common beam path portion.

This arrangement of the dichroic mirror surface provided in the prior art, which is simply referred to in the following as a 45°-arrangement, is easy to achieve. However, it is also associated with a number of disadvantages. For instance, the 45°-arrangement adversely affects the polarization neutrality of the dichroic mirror surface, i.e. its property of keeping unchanged the polarization state of the reflected and transmitted components of the light striking the mirror surface. In fact, the more significantly the surface normal of the dichroic mirror surface is inclined relative to the direction of incidence of the light, the harder this polarization neutrality is to achieve. Thus, the adverse effect of polarization optical applications increases as the angle of inclination increases. The differential interference contrast method, or DIC method for short, is an example of an application of this kind that is adversely affected by the 45°-arrangement, in which method the differences in the optical path length in the object viewed are converted into image brightness differences, and transparent phase objects thus become visible.

In addition, in a 45°-arrangement of the dichroic mirror surface it is difficult to achieve a sharp separation of the two spectral regions in which the mirror surface reflects and transmits. Thus, the desired reflection/transmission effect of a dichroic mirror surface is generally based on planned interference of the light waves that is produced by a corresponding layer structure which is attached to a transparent plane-parallel plate for example. The larger the angle between the surface normal of said layer structure and the direction of incidence of the light, the more difficult it is to achieve a sharp separation of the spectral regions using the layer structure. This problem is frequently overcome in the prior art in that additional optical structural elements are provided in order to sharply separate the reflection region and the transmission region from one another. U.S. Pat. No. 7,071,451 B2 provides, for example, an additional infrared blocking filter for this purpose, which blocking filter is arranged downstream of the mirror surface in the beam path of the transmitted detection light.

Finally, the conventionally used 45°-arrangement of the dichroic mirror surface also proves to be disadvantageous when, in order to increase the flexibility of application of the microscope, said surface is intended to be designed such that it can be inserted into or removed from the microscope beam path, depending on the application. In this case, in a 45°-arrangement, a relatively large offset of the optical axes of the beam path occurs between the two operating states in which the dichroic mirror surface is or is not arranged in the beam path of the microscope, which offset can impair the quality of the optical imaging or has to be compensated for by further structural elements.

DE 42 31 267 B4 describes a mirror arrangement known as a "Smith splitter". This mirror arrangement consists of two mirrors, one of which is formed by a splitter surface that is arranged not at 45° but rather at 22.5° relative to the optical axis. However, this splitter surface is designed as a neutral separator having a reflection and transmission effect that is independent of the wavelength. Said surface is therefore not suitable for separating different spectral components from one another.

SUMMARY

In an embodiment, the present invention provides a microscope including a light source or a plurality of light sources which, individually or together, produce an illumination beam path comprising light in a plurality of wavelength regions. A dichroic beam splitter arrangement having a dichroic mirror surface is arranged between objective optics and a tube lens in a beam path portion comprising the plurality of wavelength regions such that the mirror surface is produces a reflected partial beam in a direction of a reflected beam path by reflection and produces a transmitted partial beam in a direction of a transmitted beam path by transmission. A transmitted wavelength region of the transmitted partial beam is different from a reflected wavelength region of the reflected partial beam. The beam splitter arrangement changes a propagation direction of the reflected partial beam relative to the illumination beam path by a specified deflection angle. The mirror surface is arranged in the beam path portion at an angle of 22.5±7.5°. The beam splitter arrangement comprises at least one further mirror arranged in the reflected beam path. The propagation direction of the reflected partial beam is changed by the specified deflection angle using the sum of all reflections on the mirror surface and the at least one further mirror.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides an improved microscope having a beam splitter arrangement such that it is possible to more precisely separate the spectral regions with less technical outlay and while preventing the disadvantages described above.

A microscope of this kind comprises a light source or a plurality of light sources which, individually or together, produce an illumination beam path comprising light in a plurality of wavelength regions, a dichroic beam splitter arrangement having a dichroic mirror surface that is arranged between objective optics and a tube lens in a beam path portion comprising a plurality of wavelength regions and that produces a reflected partial beam in the direction of a reflected beam path by means of reflection, and produces a transmitted partial beam in the direction of a transmitted beam path by means of transmission, the transmitted wavelength region of which transmitted partial beam is different from the reflected wavelength region of the reflected partial beam, the beam splitter arrangement changing the propagation direction of the reflected partial beam relative to the illumination beam path by a specified deflection angle. According to an embodiment of the invention, the dichroic mirror surface is arranged in the beam path portion at an angle of 22.5±7.5°. The beam splitter arrangement comprises at least one further mirror arranged in the reflected beam path. The propagation direction of the reflected partial beam is changed by the specified deflection angle using the sum of all the reflections on the dichroic mirror surface and the at least one further mirror.

Thus, according to an embodiment of the invention, the microscope comprises a dichroic beam splitter arrangement that reflects a reflected partial beam that propagates along a reflected beam path, and transmits a transmitted partial beam that propagates along a transmitted beam path and the wavelength of which is different from the wavelength of the reflected partial beam. In addition, the microscope comprises at least one further mirror that is arranged in the reflected beam path outside the common beam path portion comprising the reflected beam path and the transmitted beam path. Said further mirror forms a reflective arrangement together with the dichroic mirror surface, which arrangement deflects the reflected partial beam in successive reflections such that the desired deflection angle is achieved. In this case, deflection angle is intended to mean the angle between the propagation direction of the light beam entering the beam splitter arrangement and the propagation direction of the light beam leaving the beam splitter arrangement.

Providing a further mirror makes it possible to orient the dichroic mirror surface such that the surface normal thereof is inclined at an angle of 22.5±7.5° relative to the optical axis of the common beam path portion. The invention thus makes it possible, moving away from the conventional 45°-arrangement, to orient the dichroic mirror surface at an angle of less than 45° relative to the optical axis of the common beam path portion. The smaller this angle, the easier it is to obtain the desired sharp separation of the spectral regions by means of a layer structure as is conventionally used to achieve a dichroic mirror surface. In particular, the arrangement according to the invention makes it possible to sharply separate the spectral regions without the need to provide further optical structural elements, such as an infrared blocking filter, for this purpose. This sharp separation is necessary in particular for fluorescence applications on living cells where highly sensitive cameras are used. Residual light from other spectral regions would be perceived here as highly interfering background structures.

Since an embodiment of the invention provides for the surface normal of the dichroic mirror surface to be oriented at a smaller angle than usual relative to the optical axis of the common beam path portion, it is also possible to ensure the desired polarization neutrality of the dichroic mirror surface. The microscope according to the invention can thus be used particularly beneficially in polarization optical applications, e.g. in the DIC method.

Furthermore, the orientation according to an embodiment of the invention of the dichroic mirror surface means that the extension of the mirror surface along the optical axis of the beam path is less than is the case in the conventional 45°-arrangement. The dichroic mirror surface thus requires less installation space along the optical axis than in the 45°-arrangement. This promotes a particularly compact microscope structure, which is particularly advantageous when dimensioning the distance-sensitive region between the objective optics and the tube lens in which the dichroic beam splitter arrangement is usually located.

If the dichroic mirror surface is to be formed such that it can be inserted into and removed from the beam path in order to increase the flexibility of application, the orientation according to an embodiment of the invention of the mirror surface thus reduces the offset of the optical axis of the beam path that occurs between the two operating states in which the mirror surface is arranged in the beam path and is removed therefrom, respectively. Moreover, the smaller installation space along the optical axis is also beneficial here.

In the configuration according to an embodiment of the invention, the surface normal of the dichroic mirror surface is only half as steeply inclined relative to the optical axis of the common beam path portion compared with the conventionally used 45°-arrangement. An arrangement of this kind at 22.5° has proven beneficial in particular with regard to the desired sharp separation of the spectral regions and with regard to the desired polarization neutrality.

It goes without saying that the solution according to the invention is not restricted specifically to the above-mentioned 22.5°-arrangement. According thereto, the angle at which the dichroic mirror surface is arranged relative to the optical axis of the common beam path portion can be varied within a tolerance range of ±7.5°. This still ensures that said angle is less than the conventionally provided angle of 45°. The intended technical effects, specifically a reduced beam offset, a sharp separation of the spectral regions and/or substantial polarization neutrality are thus achieved.

Preferably, exactly one further mirror is provided. In this case, the beam splitter arrangement according to the invention consists of just two mirror surfaces, as a result of which the optical construction can be kept simple.

The microscope according to the invention preferably comprises an adjustment device for removing the dichroic mirror surface from and inserting said mirror surface into the beam path portion. The flexibility of application of the microscope is thus increased.

Although, in a particularly preferred embodiment, the dichroic mirror surface is, at the same time, designed as a switchable splitter surface, i.e. can be inserted into and removed from the beam path portion depending on the application, it is advantageous to rigidly mount the further mirror in the microscope, e.g. in the stand thereof. This is possible because the further mirror is located outside the common beam path portion. In an operating state in which the dichroic mirror surface is removed from the beam path portion, the further mirror is thus also functionless.

In a further advantageous embodiment, an autofocus module comprising an autofocus light source is provided, which light source emits autofocus light to the beam splitter arrangement. This embodiment can be achieved, for example, in that the dichroic mirror surface that is otherwise removed from the beam path portion is inserted into the beam path portion in order to activate the autofocus module. In this case, the autofocus light source of the autofocus module preferably emits a reflected partial beam in the form of light, the wavelength of which is in the infrared region.

In a preferred embodiment, the dichroic mirror surface is arranged in an infinite beam path. This is advantageous in particular when the dichroic mirror surface is intended to be designed as a switchable element, i.e. is inserted into or removed from the beam path portion depending on the application.

Figure 1:
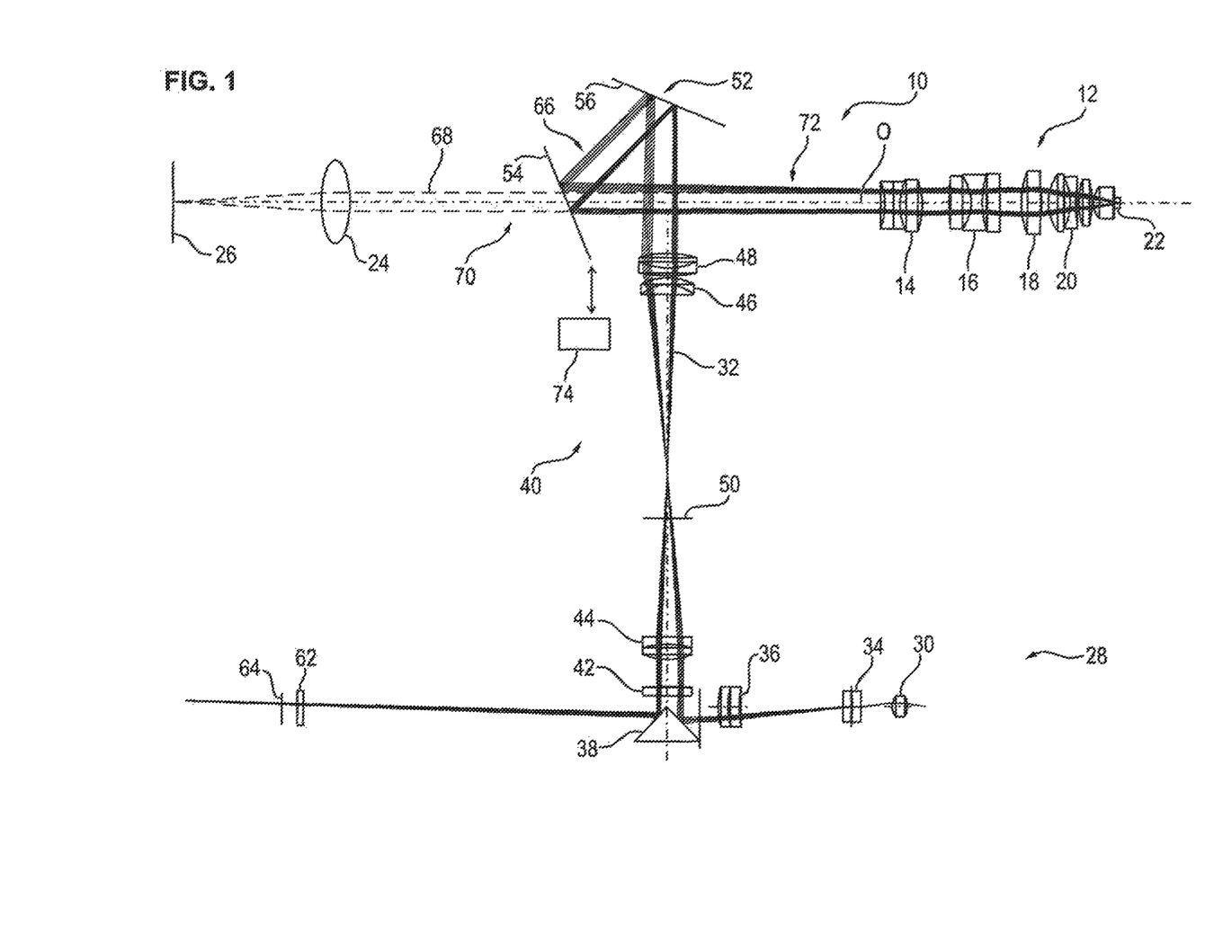
FIG. 1 is a schematic view that includes components of a microscope representing a first embodiment of the invention.

FIG. 1 shows a microscope 10 that represents a first embodiment of the invention. In this case, FIG. 1 only shows components of the microscope 10 that are necessary for understanding the invention.

The microscope 10 according to FIG. 1 comprises objective optics 12 formed by a plurality of lens groups 14, 16, 18 and 20. The objective optics 12 are used for imaging a sample 22 in an intermediate image plane 26 by means of a tube lens 24.

The microscope 10 further comprises an autofocus module 28 that has the function of focusing the objective optics 12 on the sample 22 in a known manner. The autofocus module 28 has a light source 30 that emits a reflected partial beam 32, the wavelength of which is in the infrared region. The reflected partial beam 32 emitted by the laser light source 30 passes through a blocking filter 34 that filters out the spectral components of the reflected partial beam 32 that are in the visible wavelength region. The reflected partial beam 32 then passes through a collector lens 31 and a field lens 36 and is reflected at a mirror element 38 into an optical transmission system 40 that is formed by a plurality of lens groups 42, 44, 46 and 48 and a diaphragm 50.

Figure 2:
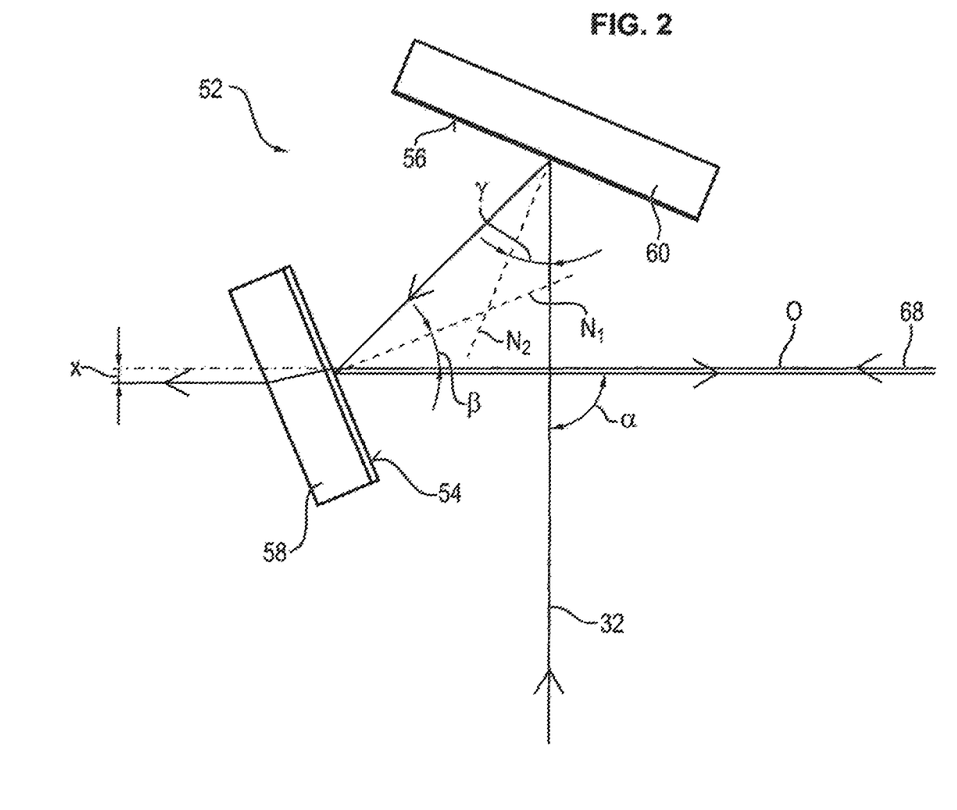
FIG. 2 is a schematic view of the dichroic beam splitter arrangement provided in the microscope according to FIG. 1.

After passing through the optical transmission system 40, the reflected partial beam 32 strikes a dichroic beam splitter arrangement 52 that is formed by a dichroic mirror surface 54 and a mirror 56. The dichroic beam splitter arrangement 52 is shown again, in greater detail, in FIG. 2. As shown in FIG. 2, the dichroic mirror surface 54 is attached as a layer structure to a transparent plane-parallel support plate 58. The totally reflective mirror 56 is provided on a further plane-parallel support plate 60.

The reflected partial beam 32 is initially reflected on the mirror 56 and then on the dichroic first mirror surface 54. Whereas the mirror 56 is designed to be totally reflective, the dichroic mirror surface 54 is formed in the manner of a layer structure, for example, so that it reflects the reflected partial beam 32 of which the wavelength is in the infrared region but transmits light of which the wavelength is in the visible region.

After being reflected on the dichroic mirror surface 54, the reflected partial beam 32 reaches the objective optics 12 and is focused thereby onto the sample 22. The part of the reflected partial beam 32 reflected on the sample 22 returns, via the objective optics 12, to the dichroic mirror surface 54 which deflects the reflected partial beam 32 onto the second mirror surface 56. Said second mirror surface reflects the reflected partial beam 32 back into the transmission system 40. The reflected partial beam 32 is then reflected at the mirror element 38 by means of pupil splitting and imaged on the detector 64 by means of a filter 62. The filter 62 and the detector 64 are part of the autofocus module 28. Said module evaluates a signal produced by the reflected partial beam 32 on the detector 64, and controls a focusing apparatus by means of said signal in order to bring the objective optics 12 into focus on the sample 22. The components provides for this control are omitted from FIG. 1.

The reflected partial beam 32 propagates in the microscope 10 along a reflected beam path that is denoted overall by 66 in FIG. 1. In contrast, the detection light originating from the sample 22 that is guided via the objective optics 12 and the tube lens 24 onto the intermediate image plane 26 propagates in the form of a transmitted partial beam 68 along a transmitted beam path denoted by 70 in FIG. 1. In the present embodiment, the wavelength of this transmitted partial beam is intended to be in the visible wavelength spectrum. Accordingly, the dichroic mirror surface 54 is designed so as to transmit light of which the wavelength is in the visible region.

The reflected beam path 66 and the transmitted beam path 70 comprise a common beam path portion between the dichroic mirror surface 54 and the sample 22 that is denoted by 72 in FIG. 1 and that has an optical axis O. As shown in FIG. 2, the optical axis O of this common beam path portion 72 is positioned on the dichroic surface 54 such that the surface normals $N_1$ thereof have an angle β of 22.5°. Accordingly, the surface normal of the second mirror surface 56, denoted by N2 in FIG. 2, also forms an angle of 22.5° with the direction of incidence of the reflected partial beam 32 that strikes said second mirror surface, which angle is denoted by γ in FIG. 2. Since, in each case, the angle of incidence of the light is equal to the angle of reflection of the light at the mirror surfaces 54 and 56, the dichroic beam splitter arrangement 52 reflects the reflected partial beam 32 entering it at a deflection angle α=90° relative to an illumination beam path that is directed towards the mirror 56 from below in FIG. 2.

Since the reflection of the reflected partial beam 32 in the objective optics 12, produced by the dichroic mirror surface 54, is only necessary during operation of the autofocus module 28, the support plate 58 on which the dichroic mirror surface 54 is located can be removed from the reflected beam path 66. An adjustment device 74, shown purely schematically in FIG. 1, is provided for this purpose. If the support plate 58 is removed from the reflected beam path, the reflected partial beam 32 is not coupled into the objective optics 12. In contrast, the support plate 60 on which the second mirror surface 56 is located is rigidly mounted in the microscope 10.

Figure 3:
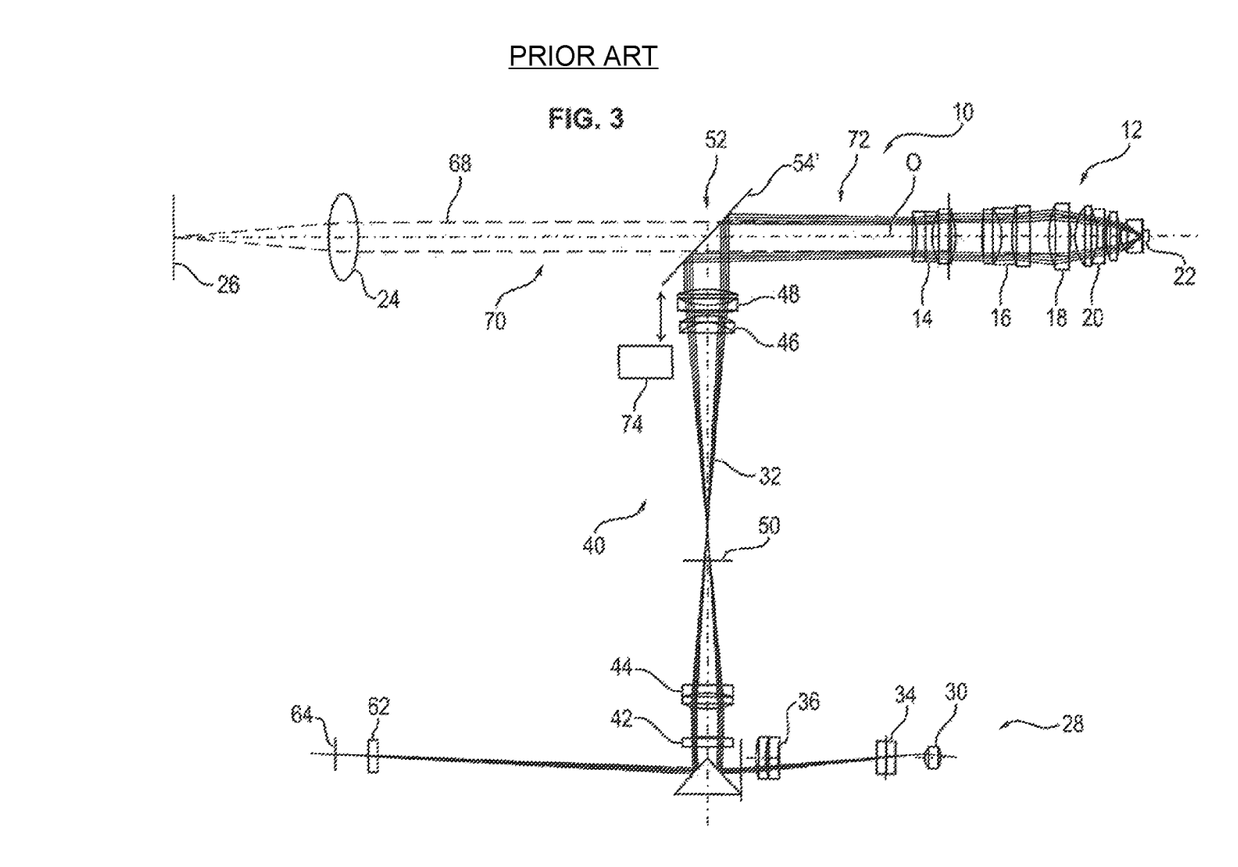
FIG. 3 is a schematic view of a microscope as a comparative example.
Figure 4:
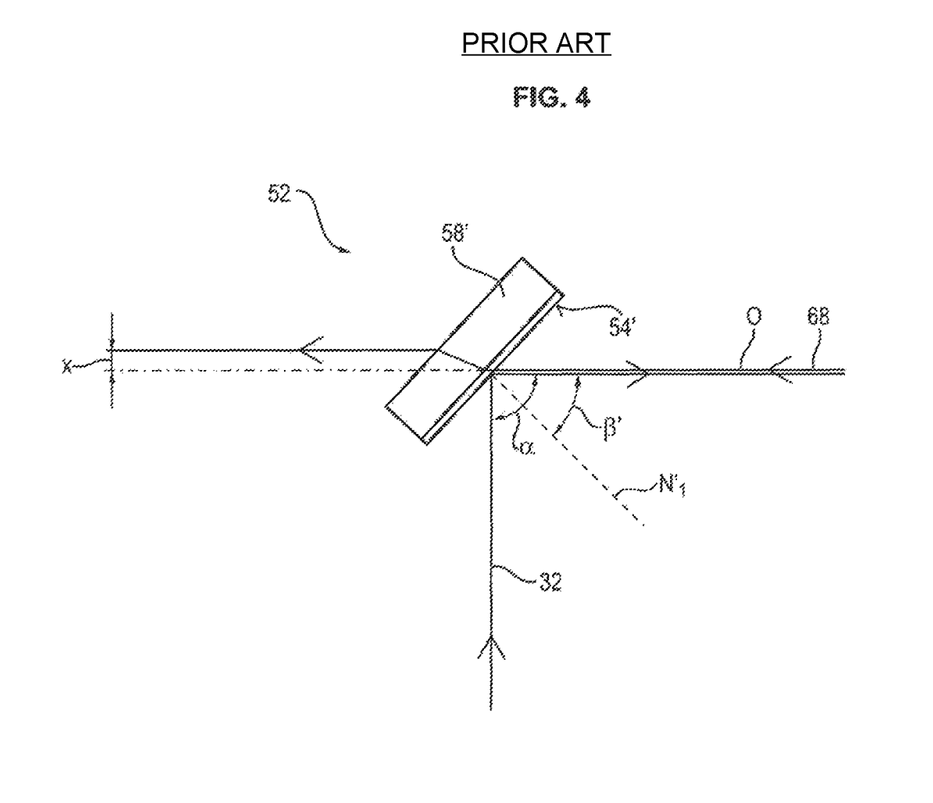
FIG. 4 is a schematic view of the beam splitter arrangement used in the microscope according to FIG. 3.

FIGS. 3 and 4 show a comparative example that is not according to the invention, and as it is usually used in the prior art. In this case, components that correspond to the components of the embodiment shown in FIGS. 1 and 2 are provided with the same reference signs in FIGS. 3 and 4.

The embodiment shown in FIGS. 1 and 2 differs from the comparative example according to FIGS. 3 and 4 essentially by the dichroic beam splitter arrangement 52. As explained above with reference to FIG. 2, in the embodiment according to the invention, the provision of the mirror 56 makes it possible to arrange the dichroic mirror surface 54 in the reflected beam path 66 such that the surface normal $N_1$ thereof (only) forms the angle β=22.5° with the optical axis O of the common beam path portion 72. In contrast, in the comparative example, only one single mirror surface, specifically the dichroic mirror surface denoted by 54', is provided. In order to achieve the deflection angle α=90°, said dichroic mirror surface 54' is arranged in the reflected beam path 66 such that the surface normal $N'_1$ thereof forms an angle β'=45° with the optical axis O of the common beam path portion 72. This corresponds to the 45°-arrangement that was described at the outset and is conventional in the prior art.

As can be seen by comparing FIGS. 2 and 4, the 22.5°-arrangement used in the embodiment according to the invention has the advantage of a smaller beam offset x that occurs between the two operating states in which the support plate 58 and 58', are arranged in the reflected beam path 66 and are removed therefrom, respectively. In order to demonstrate the size of each of these beam offsets it has been assumed, purely by way of example, that the respective support plates 58 and 58' are plates consisting of BK7 and having a thickness of 2 mm. In this example, the beam offset reduces from 0.67 mm in the 45°-arrangement to 0.28 mm in the 22.5°-arrangement according to the invention.

Figure 5:
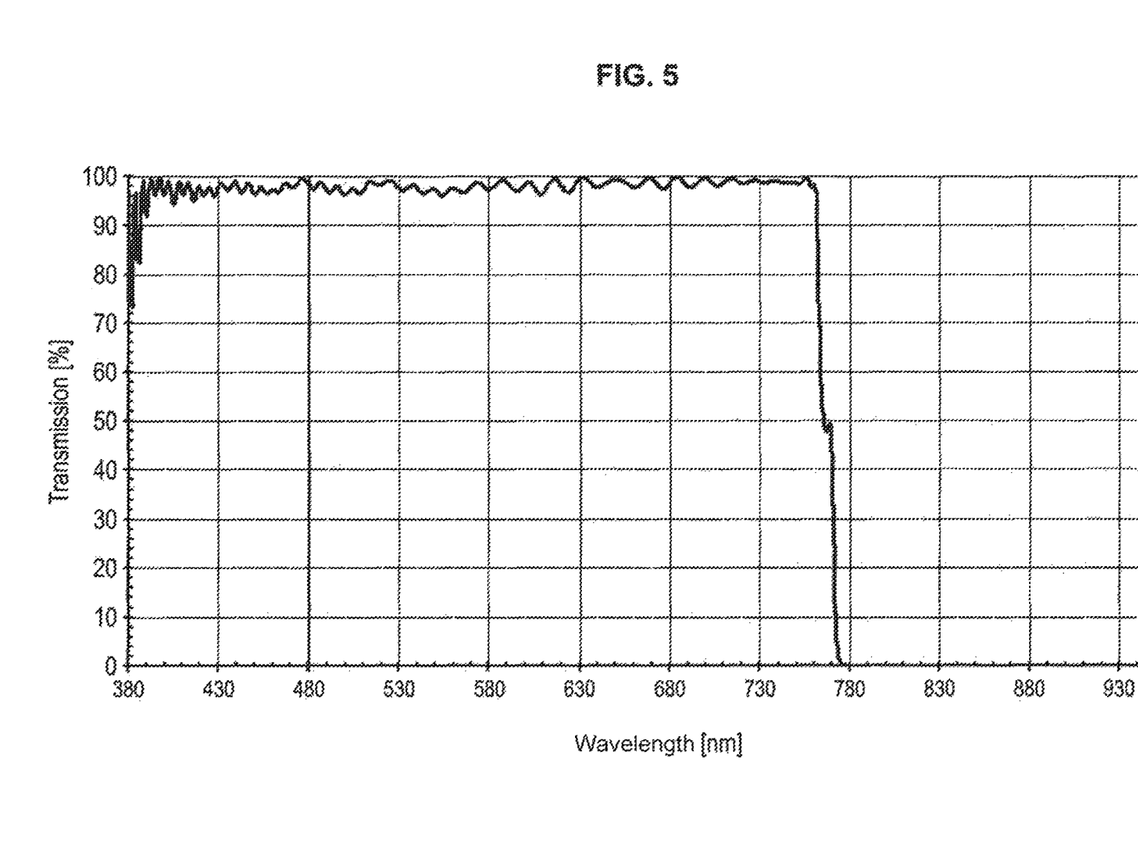
FIG. 5 is a graph showing the wavelength-dependent transmission of the dichroic mirror surface used in the microscope according to FIG. 1.
Figure 6A:
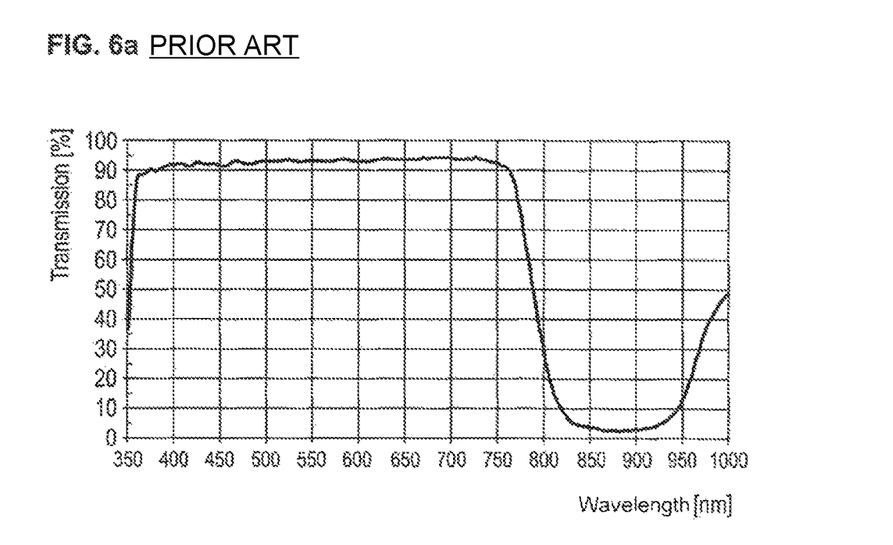
FIG. 6a is a graph showing the wavelength-dependent transmission of a dichroic mirror surface used in the prior art, as a comparative example.
Figure 6B:
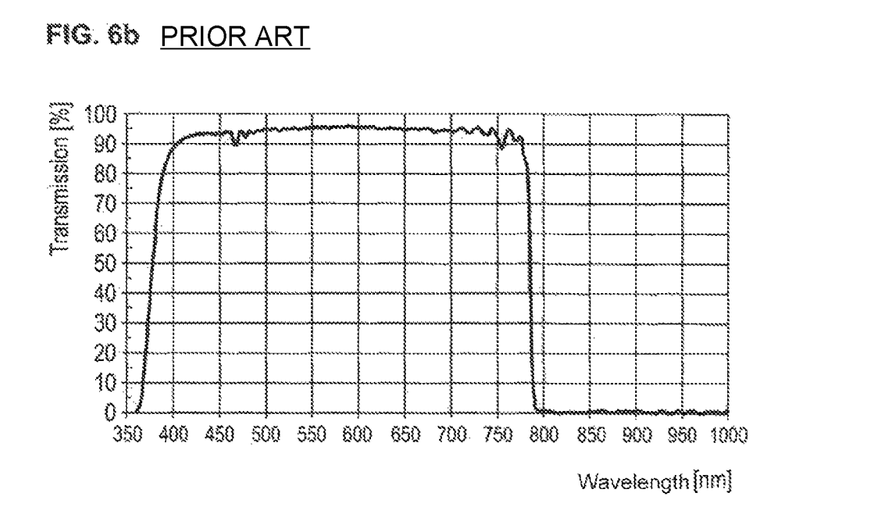
FIG. 6b is a graph showing the wavelength-dependent transmission of an infrared blocking filter used in the prior art.

FIGS. 5, 6a and 6b show a further advantage of the solution according to the invention. FIG. 5 shows an example for the wavelength-dependent transmission of the dichroic mirror surface 54 in the 22.5°-arrangement according to the invention which should be compared with the corresponding graph according to FIG. 6a which shows the transmission of the dichroic mirror surface 54' in the conventional 45°-arrangement (cf. FIG. 4). As is clear from comparing FIGS. 5 and 6a, the arrangement according to the invention permits a significantly sharper separation of the spectral regions viewed; in this embodiment, the visible region and the infrared region. Consequently, in the conventional 45°-arrangement of the dichroic mirror surface 54', an infrared blocking filter is often arranged downstream, the wavelength-dependent transmission of which filter is shown in FIG. 6b. A filter of this kind is no longer required in the embodiment shown in FIGS. 1 and 2.

Figure 7:
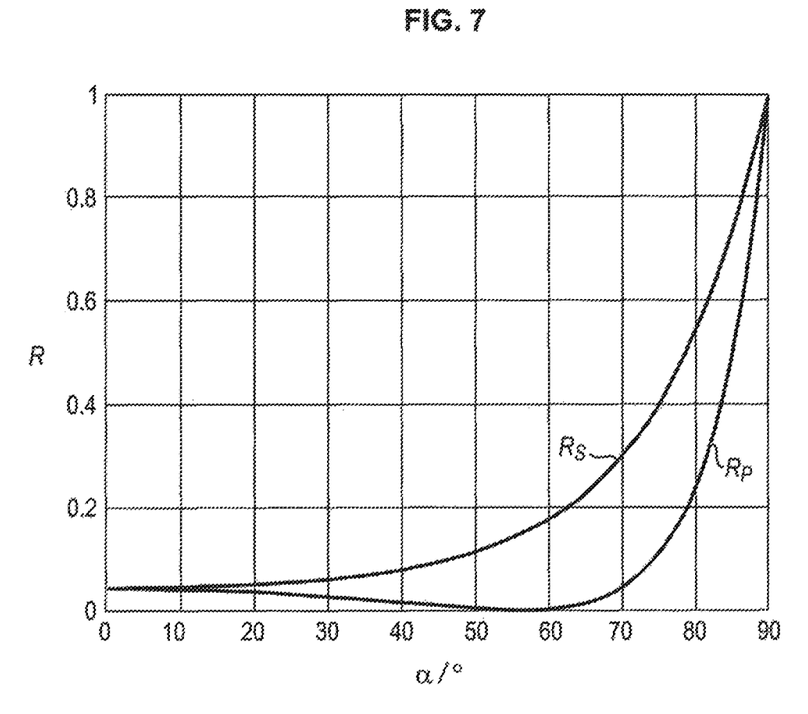
FIG. 7 is a graph showing the angular dependence of the polarization neutrality, using the example of reflection on a glass plate.

Finally, FIG. 7 shows how arranging the dichroic mirror surface 54' in the reflected beam path 66 affects the polarization neutrality. For this purpose, FIG. 7 shows the reflectance $R_S$ and $R_P$ for the reflection of light, polarized perpendicularly and in parallel, respectively, on a glass plate having a refractive index of 1.5. As the graph according to FIG. 7 shows, the two reflectances $R_S$ and $R_P$ deviate more from one another the greater the deflection angle α becomes. Consequently, the 22.5°-arrangement according to an embodiment of the invention of the dichroic mirror surface 54 is significantly better with regard to the polarization neutrality than the conventional 45°-arrangement.

As already mentioned above, the solution according to the invention is not limited to the 22.5°-arrangement provided in the embodiment specifically described. The angle at which the surface normal $N_1$ of the dichroic mirror surface 54 can be arranged relative to the optical axis O of the common beam path portion 72 can also be different, in a range of 7.5°, provided that said angle is small enough to achieve the desired technical effects, specifically a reduced beam offset, a sharp separation of the spectral regions and/or substantial polarization neutrality.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 microscope
12 objective optics
14, 16, 18, 20 lens groups
22 sample
24 tube lens
26 intermediate image plane
28 autofocus module
30 laser light source
31 collector lens
32 reflected partial beam
34 blocking filter
36 field lens
38 mirror element
40 optical transmission system
42, 44, 46, 48 lens groups
50 diaphragm
52 dichroic beam splitter arrangement
54 dichroic first mirror surface
56 second mirror surface
58, 60 support plates
62 filter
64 detector
66 reflected beam path
70 transmitted beam path
72 common beam path portion
74 adjustment device
N1, N2 surface normal
α, β, γ angle
x beam offset

The invention claimed is:

1. An autofocus assembly of a microscope, comprising:
an autofocus module comprising a detector and an autofocus light source configured to emit an autofocus beam along an autofocus beam path toward the detector; and
a dichroic beam splitter arrangement having a dichroic mirror surface and at least one further mirror disposed along the autofocus beam path between the autofocus light source and the detector, and in a common beam path portion between objective optics and a tube lens of the microscope, the dichroic beam splitter arrangement being configured to transmit light of a transmitted wavelength region and to reflect light of a reflected wavelength region that is different from the transmitted wavelength region, a surface normal of the dichroic mirror surface being arranged in the common beam path portion at an angle of 22.5±7.5° relative to the optical axis of the common beam path portion.

2. The autofocus assembly according to claim 1, wherein the dichroic mirror surface is removable from the common beam path portion in a case in which the autofocus module is not in use.

3. The autofocus assembly according to claim 1, wherein the at least one further mirror consists of only one mirror.

4. The autofocus assembly according to claim 1, wherein the dichroic mirror surface is formed of a layer structure attached to a plane-parallel transparent support plate.

5. The autofocus assembly according to claim 1, further comprising an adjustment device configured to remove the dichroic mirror surface from the common beam path portion and to insert the dichroic mirror surface into the common beam path portion.

6. The autofocus assembly according to claim 5, wherein the at least one further mirror is rigidly mounted in the microscope.

7. The autofocus assembly according to claim 1, wherein the wavelength of the autofocus light emitted by the autofocus light source is in the infrared region.

8. The autofocus assembly according to claim 1, wherein the autofocus light source emits the autofocus beam to the at least one further mirror arranged outside the common beam path portion such that the at least one further mirror reflects the autofocus beam onto the dichroic mirror surface and the dichroic mirror surface reflects the reflected autofocus beam into the common beam path portion.

9. The autofocus assembly according to claim 8, wherein the dichroic mirror surface is configured to transmit the light of the transmitted wavelength region in the common beam path portion in a propagation direction counter to the reflected light of the autofocus beam path.

10. The autofocus assembly according to claim 9, wherein the dichroic mirror surface is arranged upstream of the objective optics arranged in the common beam path portion in the propagation direction of the reflected light of the autofocus beam path.

11. The autofocus assembly according to claim 1, wherein the dichroic mirror surface is arranged in an infinite beam path.

* * * * *